United States Patent [19]

Roberts

[11] 4,311,349
[45] Jan. 19, 1982

[54] SLEEVE BEARING

[75] Inventor: Arden J. Roberts, Warren, Mich.

[73] Assignee: Federal-Mogul Corporation, Mich.

[21] Appl. No.: 153,247

[22] Filed: May 27, 1980

[51] Int. Cl.$^3$ .............................................. F16C 33/10
[52] U.S. Cl. .................................... 308/122; 308/240
[58] Field of Search .................. 308/23, 121, 122, 240

[56] References Cited

U.S. PATENT DOCUMENTS

| 3,168,358 | 2/1965 | Buske | 308/240 |
| 3,172,304 | 3/1965 | Robertson | 308/122 |
| 3,201,183 | 8/1965 | Buske | 308/240 |
| 3,625,580 | 12/1971 | DeHart et al. | 308/240 |
| 4,235,481 | 11/1980 | Fukuoka et al. | 308/122 |

Primary Examiner—Richard R. Stearns
Attorney, Agent, or Firm—William G. Coon

[57] ABSTRACT

A sleeve bearing (20) having an outer cylindrical surface concentric to a center (24) and an inner bearing surface for surrounding a cylindrical journaled member (26) in closed spaced relationship. The inner bearing surface has oppositely disposed first (28) and second (30) crown surfaces which are divided by a dividing diameter (A) and first clearance surfaces (32) extending circumferentially from opposite extremities of the first crown surface (28) and second clearance surfaces (34) extending circumferentially from opposite extremities of the second crown surface (30) and intersecting the first clearance surfaces (32). The crown surfaces (28, 30) extend circumferentially on a first radius (r) which closely approximates the radius of the journaled member (26). The clearance surfaces (32, 34) extend circumferentially on a second radius (r') which is greater than the first radius (r). The first and second radii (r, r') intersect at the junctures (38) between the crown surfaces (28, 30) and the clearance surfaces (32, 34). The first radius (r) for the first crown surface (28) has a first axis (40) on the dividing diameter (A) and spaced from the center (24) on one side thereof and the first radius (r) for the second crown surface (30) has a second axis (42) on the dividing diameter (A) and spaced from the center (24) on the opposite side thereof from the first axis (40). The second radius (r') for the first clearance surfaces (32) has a center (44) spaced radially outwardly of said second axis (42) whereas the second radius (r') for the second clearance surfaces (34) has a center (46) spaced radially outwardly from the first axis (40).

11 Claims, 2 Drawing Figures

SLEEVE BEARING

BACKGROUND OF THE INVENTION

This invention relates to a sleeve bearing of the type having an oil film or layer between the bearing surface and a journaled member. The invention is particularly applicable to half-shell sleeve bearings used in internal combustion engines in cooperation with crank shafts and connecting rods. However, it will be appreciated that the invention has broader applications and may be used in other environments of this general type.

Engine main and connecting rod bearings in internal combustion engines are subjected to repetitive loads which can ultimately fatigue the bearing. These bearings are disposed in a continuously circulated oil bath and there is a clearance provided between the outer peripheral surface of the journaled member or crank shaft and the inner peripheral bearing surface of the sleeve bearing. This facilitates relative rotation between the parts during normal engine operation and facilitates the creation of an oil film between the parts which acts as a load-supporting medium during engine operation. The hydrodynamic wedge effect of the oil causes the shaft or journaled member to float on an oil film as a result of there being a difference between the shaft and bearing radii, i.e., a clearance. The oil in the clearance provides lubrication and cooling. It has been shown that the oil film pressure developed in such bearings increases during the high-load portion of cycle with increased bearing clearance. Bearings exposed to higher pressures fatigue sooner or to a greater extent than bearings exposed to lower pressures. A greater clearance provides a greater oil film pressure and a greater oil film pressure causes the bearing to fatigue faster. It seemingly would be a mere matter of reducing the oil film clearance to reduce the oil film pressure to increase the bearing life. The clearance cannot simply be reduced, however, as that would reduce the lubrication and cooling causing the bearing to run hotter and possibly burn up during operation.

The subject invention provides an improved sleeve bearing which reduces the oil film thickness or clearance during the high-load portions of a revolution while maintaining proper clearance for oil circulation during the unloaded portion of a revolution.

SUMMARY OF THE INVENTION

A sleeve bearing having an outer cylindrical surface concentric to a center and an inner bearing surface for surrounding a cylindrical journaled member in close spaced relationship. The inner bearing surface has oppositely disposed first and second crown surfaces which are divided by a dividing diameter and first clearance surfaces extending circumferentially from opposite extremities of the first crown surface and second clearance surfaces extending circumferentially from opposite extremities of the second crown surface and intersecting the first clearance surfaces. The crown surfaces extend circumferentially on a first radius which closely approximates the radius of the journaled member. The clearance surfaces extend circumferentially on a second radius which is greater then the first radius. The first and second radii intersect at the junctures between the crown surfaces and the clearance surfaces. The first radius for the first crown surface has a first axis on the dividing diameter and spaced from the center on one side thereof and the first radius for the second crown surface has a second axis on the dividing diameter and spaced from the center on the opposite side thereof from the first axis. The second radius for the first clearance surfaces has a center on the dividing diameter on the opposite side of the center, whereas the second radius for the second clearance surfaces has a center on the dividing diameter on the first side of the center.

PRIOR ART STATEMENT

There are known sleeve bearings with a portion of the bearing surface having a radius nearly equal to the radius of the journaled members so as to reduce the clearance during the high-load portion of the bearing cycle to reduce oil film pressure while including a second portion with a greater clearance. An example of such a bearing is shown in U.S. Pat. No. 3,625,580 granted Dec. 7, 1971. That patent shows a sleeve having oppositely disposed crown portions struck on a center which coincides with the center of the sleeve and the center of the journaled member when centrally disposed. Clearance surfaces on either side of the crown surfaces are struck on radii disposed about axes on a diameter and on either side of the center axis. The subject invention represents an improvement because the respective radii for the opposite crown surfaces are spaced on a dividing diameter on either side of the center and closely approximate the radius of the journaled member. Accordingly, during the high-load portion of a revolution the journaled member will closely conform to a crown surface but later, during a portion of the revolution, the journaled member may move away from that crown surface in a direction toward the opposite crown surface thereby providing clearance with the first crown surface for allowing lubricant to flow therethrough for cooling and flushing.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
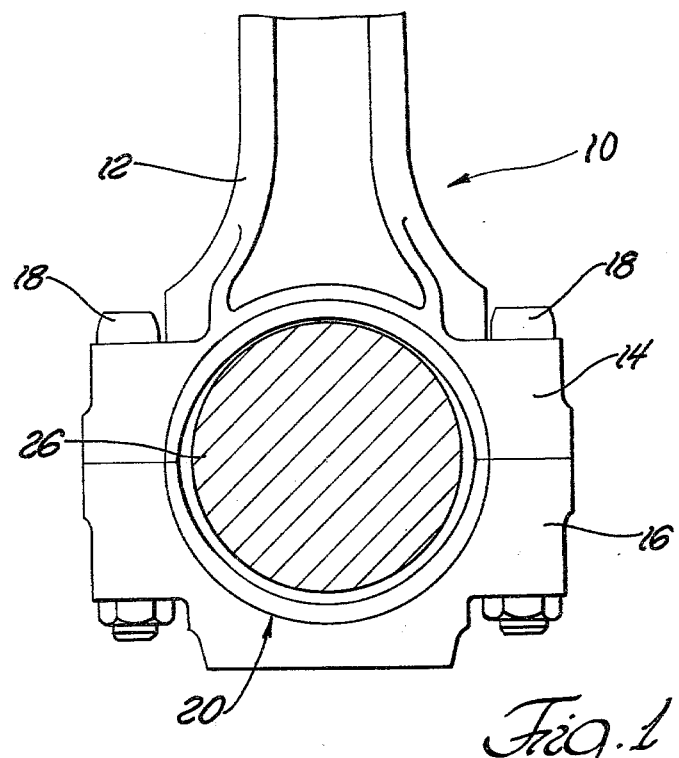
FIG. 1 is a fragmentary elevational view of a rod assembly incorporating the bearing of the subject invention.
Figure 2:
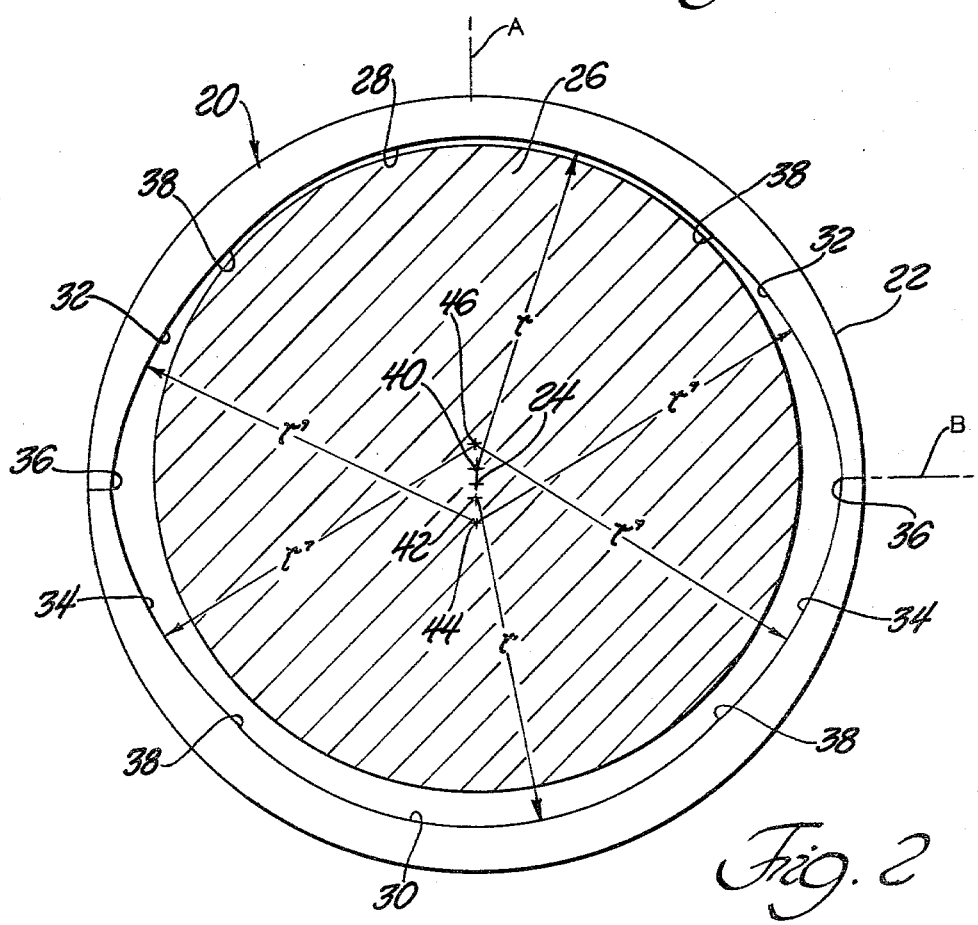
FIG. 2 is an enlarged side view of the sleeve bearing of the subject invention shown disposed about a journaled member.

An end rod assembly is generally shown at 10. The assembly 10 includes an elongated rod 12 having a longitudinal axis and integral with an upper bearing housing 14. A separate lower bearing housing 16 is included and is connected to the upper bearing housing 14 by the bolts 18 whereby the housings 14 and 16 define a circular bearing pocket. Each of the housings 14 and 16 provide one half of the circular circumference of the bearing pocket.

A sleeve bearing, generally shown at 20, is disposed in the circular bearing pocket defined by the housings 14 and 16. The sleeve bearing 20 has an outer cylindrical surface 22 concentric to a bearing center 24. The sleeve bearing 20 has an inner bearing surface for surrounding a cylindrical journaled member 26 in close spaced relationship therewith in a manner defining a clearance space with the journaled member 26 to receive lubricant.

The inner bearing surface has oppositely disposed first 28 and second 30 crown surfaces which are divided by a dividing diameter A. The inner bearing surface also includes first clearance surfaces 32 extending circumferentially from opposite extremities of the first crown surface 28 and second clearance surfaces 34 extending circumferentially from opposite extremities of the second crown surface 30 and intersecting the first clearance surfaces 32 at positions 36 on a parting diameter B.

The crown surfaces 28 and 30 extend circumferentially on a first radius r which closely approximates the radius of the journaled member 26. The clearance surfaces 32 and 34 extend circumferentially on a second radius r' which is greater than the first radius r. The first and second radii r and r' intersect at the junctures 38 between the crown surfaces 28 and 30 and the clearance surfaces 32 and 34.

The first radius r for the first crown surface 28 has a first axis 40 on the dividing diameter A and spaced from the center 24 on a first side thereof and the first radius r for the second crown surface 30 has a second axis 42 on the dividing diameter A and spaced from the center 24 on the opposite side thereof from the first axis 40. In accordance with the invention, the center for a crown surface is on one side of the center 24 while the joining clearance surfaces have a center on the opposite side of the center 24 with the radius r' for the clearance surfaces being greater than the radius r for the crown surface. Said another way, the centers for the crown surfaces and the clearance surfaces may be on the diameter A but all spaced from one another along diameter A. In the specific embodiment illustrated, the second radius r' for the first clearance surfaces 32 has a center 44 spaced from the second axis 42 and the second radius r' for the second clearance surfaces 34 has a center 46 spaced from the first axis 40. In other words, the center of evolution for the arc for one crown surface is spaced radially inwardly of the center of evolution for the clearance surfaces disposed at the opposite extremities of the opposite crown surface. The first axis 40 is spaced from the center 24 in the direction of the first crown surface 28 and the second axis 42 is spaced from the center 24 in the direction of the second crown surface 30. The first and second axes 40 and 42 are equally spaced from the bearing center 24. The centers 44 and 46 are also equally spaced from the bearing center 24. Further, the center 44 for the second radius r' for the first clearance surfaces 32 is on the opposite side of the second axis 42 from the bearing center 24 and the center 46 for the second radius r' for the second clearance surfaces 34 is on the opposite side of the first axis 40 from the bearing center 24.

The sleeve 20 comprises a pair of semicircular half shells which engage or mate one another on the parting diameter B which is perpendicular to the dividing diameter A. The axis for the crown surface of a half shell and the center for the clearance surfaces for that half shell are unequally spaced from the bearing center of the outer surface of that half shell.

As will be appreciated, and as is illustrated in FIG. 1, during a high-load portion of a revolution, the upper crown surface 28 is in close spaced relationship to the journaled member 26, i.e., very small clearance, thereby reducing the film thickness for increasing bearing life. However, and by way of illustration, when the journaled member 26 has moved farther through a revolution, it will move away from the crown surface 28 and toward the crown surface 30 thereby providing a greater clearance between the journaled member 26 and the crown surface 28 for flushing and cooling with lubricant. In other words, the center of the journaled member 26 during each revolution generally moves back and forth between the first and second centers or axes 40 and 42. Because there must be some clearance, the center of the journaled member 26 approaches but is not coincident with the respective axes 40 and 42 of the crown surfaces. However, the closer the center of the journaled member 26 is to the center of the crown surface during the load portion of a revolution, the thinner will be the oil film.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A sleeve bearing (20) having an outer cylindrical surface (22) concentric to a bearing center (24) and an inner bearing surface for surrounding a cylindrical journaled member (26) in close spaced relationship therewith, said inner bearing surface having oppositely disposed first (28) and second (30) crown surfaces which are divided by a dividing diameter (A) and first clearance surfaces (32) extending circumferentially from opposite extremities of said first crown surface (28) and second clearance surfaces (34) extending circumferentially from opposite extremities of said second crown surface (30) and intersecting said first clearance surfaces (32), said crown surfaces (28, 30) extending circumferentially on a first radius (r) which closely approximates the radius of the journaled member (26), said clearance surfaces (32, 34) extending circumferentially on a second radius (r') which is greater than said first radius (r), said first and second radii (r, r') intersecting at the junctures (38) between said crown surfaces (28, 30) and said clearance surfaces (32, 34), said bearing characterized by, said first radius (r) for said first crown surface (28) having a first axis (40) on said dividing diameter (A) spaced from said center (24) on a first side thereof and said first radius (r) for said second crown surface (30) having a second axis (42) on said dividing diameter (A) spaced from said center (24) on the opposite side thereof from said first axis (40), said second radius (r') for said first clearance surfaces (32) having a center (44) on said dividing diameter (A) on said opposite side and said second radius (r') for said second clearance surfaces (34) having a center (46) on said dividing diameter (A) on said first side thereof.

2. A bearing as set forth in claim 1 wherein said first axis (40) is spaced from said center (24) in the direction of said first crown surface (28) and said second axis (42) is spaced from said center (24) in the direction of said second crown surface (30).

3. A bearing as set forth in claim 2 wherein said first and second axes (40, 42) are equally spaced from said center (24).

4. A bearing as set forth in claim 3 wherein said sleeve (20) comprises a pair of semicircular half shells.

5. A bearing as set forth in claim 4 wherein said half shells engage one another on a parting diameter (B) which is perpendicular to said dividing diameter (A).

6. A bearing as set forth in claim 5 wherein said center (44) for said second radius (r') for said first clearance surfaces (32) is spaced from said second axis (42) and said center (46) for said second radius (r') for said second clearance surfaces (34) is spaced from said first axis (40).

7. A bearing as set forth in claim 6 wherein said center (44) for said second radius (r') for said first clearance surfaces (32) is on the opposite side of said second axis (42) from said center (24) and said center (46) for said second radius (r') for said second clearance surfaces (34) is on the opposite side of said first axis (40) from said center (24).

8. A sleeve bearing half shell having an outer cylindrical surface concentric to a center (24) and an inner bearing surface for surrounding a cylindrical journaled member (26) in close spaced relationship therewith, said inner bearing surface having a centrally disposed crown surface (28) divided by a dividing diameter (A) and first clearance surfaces (32) on each extremity of said crown surface (28), said crown surface (28) extending circumferentially on a first radius (r) which closely approximates the radius of the journaled member (26), said clearance surfaces (32) extending circumferentially on a second radius (r') which is greater than said first radius (r), characterized by said first radius (r) for said crown surface (28) having a first axis (40) on said dividing diameter (A) spaced from said center (24) and said second radius (r') for said clearance surfaces (32) having a center (44) on said dividing diameter (A) spaced on the opposite side of said center (24) from said first axis (40).

9. A half shell as set forth in claim 8 wherein said first axis (40) is spaced from said center (24) in the direction of said crown surface (28).

10. A half shell as set forth in claim 9 wherein said first and second radii (r, r') intersect at the junctures between said crown surface (28) and said clearance surfaces (32).

11. A half shell as set forth in claim 10 wherein said first axis (40) and said center (44) of said clearance surfaces (32) are unequally spaced from said center (24).

* * * * *